US012565544B2

(12) United States Patent
Yukumoto et al.

(10) Patent No.: US 12,565,544 B2
(45) Date of Patent: Mar. 3, 2026

(54) PARTIAL OXIDATIVE COUPLING CATALYST AND OLEFIN PRODUCTION DEVICE AND OLEFIN PRODUCTION METHOD USING CATALYST

(71) Applicants: MITSUBISHI HEAVY INDUSTRIES, LTD., Tokyo (JP); The University of Tokyo, Tokyo (JP)

(72) Inventors: Atsuhiro Yukumoto, Tokyo (JP); Yukio Tanaka, Tokyo (JP); Noriaki Senba, Tokyo (JP); Kazuhiro Takanabe, Tokyo (JP); Bhavin Siritanaratkul, Tokyo (JP)

(73) Assignees: MITSUBISHI HEAVY INDUSTRIES, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 667 days.

(21) Appl. No.: 17/927,517

(22) PCT Filed: Sep. 16, 2021

(86) PCT No.: PCT/JP2021/034125
§ 371 (c)(1),
(2) Date: Nov. 23, 2022

(87) PCT Pub. No.: WO2022/065196
PCT Pub. Date: Mar. 31, 2022

(65) Prior Publication Data
US 2023/0242682 A1 Aug. 3, 2023

(30) Foreign Application Priority Data
Sep. 25, 2020 (JP) ................................. 2020-160435

(51) Int. Cl.
| | |
|---|---|
| *C08F 4/18* | (2006.01) |
| *B01J 35/57* | (2024.01) |
| *C08F 2/34* | (2006.01) |

(52) U.S. Cl.
CPC ................. *C08F 4/18* (2013.01); *B01J 35/57* (2024.01); *C08F 2/34* (2013.01); *C08F 2410/07* (2021.01); *C08F 2810/30* (2013.01)

(58) Field of Classification Search
CPC ....... C07C 2/84; C07C 11/04; C07C 2521/06; C07C 2523/04
See application file for complete search history.

(56) References Cited

U.S. PATENT DOCUMENTS

| | | | |
|---|---|---|---|
| 2004/0220053 A1 | 11/2004 | Bagherzadeh et al. | |
| 2007/0055083 A1 | 3/2007 | Bagherzadeh et al. | |

(Continued)

FOREIGN PATENT DOCUMENTS

| | | |
|---|---|---|
| JP | H10-118490 A | 5/1998 |
| JP | 2007-523737 A | 8/2007 |

(Continued)

OTHER PUBLICATIONS

Aguila, et al., "ZrO2-Supported Alkali Metal (Li, Na, K) Catalysts for Biodiesel Production," J. Chil. Chem. Soc., 61, No. 4 (2016), 3233-3238. (Year: 2016).*

(Continued)

*Primary Examiner* — Fred M Teskin
(74) *Attorney, Agent, or Firm* — Osha Bergman Watanabe & Burton LLP

(57) ABSTRACT

A partial oxidative coupling catalyst has a structure in which a component represented by $M_2ZrO_3$ is supported on a support, where M represents an alkali metal.

6 Claims, 5 Drawing Sheets

(56)         References Cited

U.S. PATENT DOCUMENTS

| | | | |
|---|---|---|---|
| 2010/0331595 | A1 | 12/2010 | Chinta et al. |
| 2014/0121433 | A1 | 5/2014 | Cizeron et al. |
| 2015/0152025 | A1 | 6/2015 | Cizeron et al. |
| 2017/0014807 | A1 | 1/2017 | Liang et al. |
| 2018/0185826 | A1 | 7/2018 | Uetani et al. |
| 2020/0024214 | A1 | 1/2020 | Cizeron et al. |
| 2020/0079708 | A1 | 3/2020 | Mitkidis et al. |
| 2020/0347000 | A1 | 11/2020 | Tachibana et al. |

FOREIGN PATENT DOCUMENTS

| | | | |
|---|---|---|---|
| JP | 2008-126192 | A | 6/2008 |
| JP | 2012-532104 | A | 12/2012 |
| JP | 2015-522407 | A | 8/2015 |
| JP | 2019-202945 | A | 11/2019 |
| JP | 2020-028821 | A | 2/2020 |
| WO | 2019-116484 | A1 | 6/2019 |

OTHER PUBLICATIONS

Office Action Issued in Corresponding Australian Application No. 2021347077, dated Nov. 1, 2023. (5 pages).

* cited by examiner

PARTIAL OXIDATIVE COUPLING CATALYST AND OLEFIN PRODUCTION DEVICE AND OLEFIN PRODUCTION METHOD USING CATALYST

TECHNICAL FIELD

The present disclosure relates to a partial oxidative coupling catalyst and an olefin production device and an olefin production method using this catalyst.

The present application claims priority based on Japanese Patent Application No. 2020-160435 filed on Sep. 25, 2020, the entire content of which is incorporated herein by reference.

BACKGROUND ART

A technique for producing an olefin by partial oxidative coupling reaction (oxidative coupling of methane, hereinafter referred to as OCM reaction) using a gas containing methane such as natural gas is known. Patent Document 1 discloses a method for producing an olefin by the OCM reaction of methane. In this method, a partial oxidative coupling catalyst with sodium tungstate ($Na_2WO_4$) as an active component is used.

CITATION LIST

Patent Literature

Patent Document 1: JP2019-202945A

SUMMARY

Problems to be Solved

In the OCM reaction of methane, in addition to the main reaction in which methane reacts with oxygen to produce an olefin such as ethylene, there are also side reactions in which methane reacts with oxygen to produce carbon monoxide and carbon dioxide and the produced olefin is oxidized to produce carbon dioxide. As the side reactions progress, more carbon dioxide is produced, and the olefin selectivity decreases.

In view of the above problem, an object of at least one embodiment of the present disclosure is to provide a partial oxidative coupling catalyst and an olefin production device and an olefin production method using this catalyst whereby it is possible to improve the olefin selectivity.

Solution to the Problems

To achieve the above object, a partial oxidative coupling catalyst according to the present disclosure has a structure in which a component represented by $M_2ZrO_3$ is supported on a support, where M represents an alkali metal.

Advantageous Effects

With the partial oxidative coupling catalyst according to the present disclosure, it is possible to improve the olefin selectivity in the partial oxidative coupling reaction of methane.

DETAILED DESCRIPTION

Hereinafter, a partial oxidative coupling catalyst and an olefin production device and an olefin production method using this catalyst according to embodiments of the present disclosure will be described based on the drawings. The following embodiments are illustrative and not intended to limit the present disclosure, and various modifications are possible within the scope of technical ideas of the present disclosure.

Figure 1:
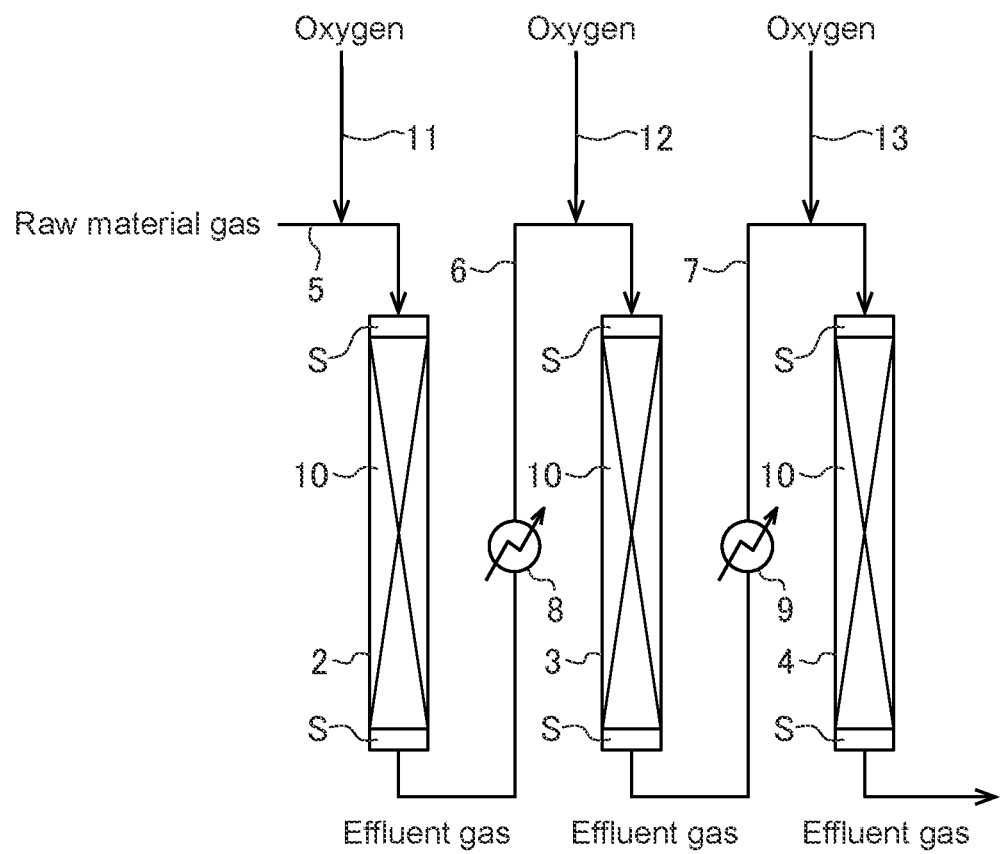
FIG. 1 is a schematic configuration diagram of an olefin production device according to an embodiment of the present disclosure.

Configuration of Olefin Production Device According to Embodiment of Present Disclosure As shown in FIG. 1, an olefin production device 1 according to an embodiment of the present disclosure includes a plurality of reactors 2, 3, and 4. In FIG. 1, the olefin production device 1 includes three reactors 2, 3, and 4, but the number is not limited to three and may include one reactor, two reactors, or four or more reactors.

To the reactor 2 at the first stage is connected a supply pipe 5 for supplying a raw material gas containing methane to the reactor 2. The reactor 2 communicates with the reactor 3 at the second stage through a connecting pipe 6, and the reactor 3 communicates with the reactor 4 at the third stage through a connecting pipe 7. That is, three reactors 2, 3, and 4 are connected in series. The connecting pipes 6, 7 may be provided with coolers 8, 9 for cooling a later-described effluent gas flowing through the connecting pipes 6, 7, respectively.

Each of the reactors 2, 3 and 4 contains a partial oxidative coupling catalyst 10.

Inside each of the reactors 2, 3 and 4, spaces S are formed upstream and downstream of the partial oxidative coupling catalyst 10 in the longitudinal direction thereof. The spaces S are not intentionally provided, but are inevitably formed due to the structure of the reactors 2, 3 and 4, and it is preferable to make the volume of the spaces S as small as possible.

To the supply pipe 5 is connected an oxygen supply pipe 11 for supplying oxygen into the supply pipe 5. To the connecting pipes 6, 7 are connected oxygen supply pipes 12, 13 for supplying oxygen into the connecting pipes 6, 7 downstream of the coolers 8, 9, respectively.

Configuration of Partial Oxidative Coupling Catalyst According to Embodiment of Present Disclosure The partial oxidative coupling catalyst 10 has a structure in which an active component represented by $M_2ZrO_3$, where M represents an alkali metal, such as sodium zirconate ($Na_2ZrO_3$) and lithium zirconate ($Li_2ZrO_3$), is supported on a support. The active component supported on the support is not limited to one type, and multiple types of active components with different alkali metals M may be supported. For example, sodium zirconate and lithium zirconate may be supported on the support in any ratio. The configuration of the support is not particularly limited, and a support with any configuration can be used. By supporting the active component on the support, handling during catalyst loading is improved. Further, by supporting it on a support with a large specific surface area, the number of catalytically active sites per unit volume of catalyst can be increased.

Figure 2:
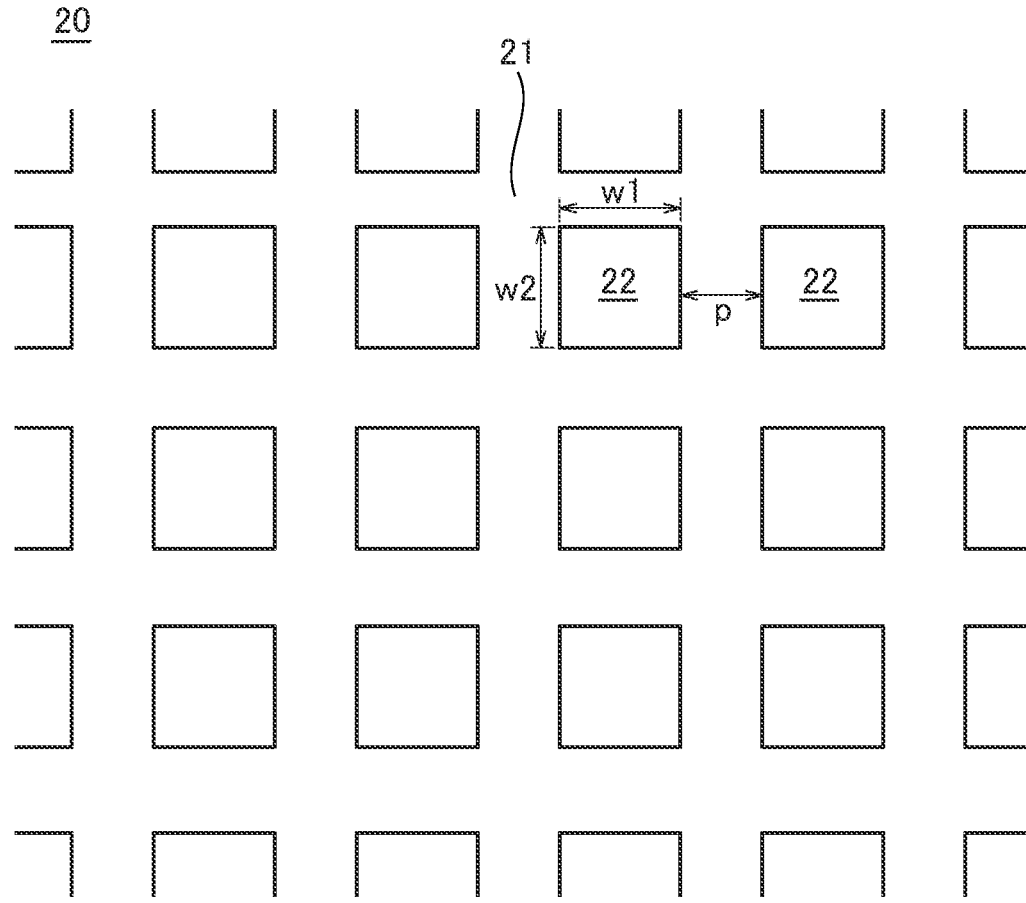
FIG. 2 is an enlarged partial front view of a micro-honeycomb structure used as a support of a partial oxidative coupling catalyst according to an embodiment of the present disclosure.

In order to further increase the surface area of the active component, it is preferable to use a support with a high specific surface area. As such a support, it is preferable to use a support in the form of nanowire or micro-honeycomb. The nanowire means a configuration with at least one nanometer-order diameter and an aspect ratio exceeding 10:1. The micro-honeycomb means a configuration having a plurality of elongated holes 22 formed in parallel in a body portion 21 of a micro-honeycomb 20, with micrometer-order aperture size w1 or w2 of each hole 22 and micrometer-order wall thickness p between adjacent holes 22, as shown in FIG. 2. Regardless of whether it has a nanowire or micro-honeycomb configuration, the support used for the partial oxidative coupling catalyst 10 may be made of any ceramic such as alumina ($Al_2O_3$), silica ($SiO_2$), or zirconia ($ZrO_2$), any resin, or any metal.

<Operation of olefin production device according to embodiment of present disclosure (Olefin production method)>

Next, the operation of the olefin production device 1, i.e., the olefin production method will be described. The raw material gas flowing through the supply pipe 5 is mixed with oxygen supplied to the supply pipe 5 through the oxygen supply pipe 11 to form a reactant gas, and is supplied to the reactor 2. In the reactor 2, under the catalytic action of the partial oxidative coupling catalyst 10, ethylene is produced by the main reaction represented by the following reaction formula (1), for example.

$$2CH_4 + O_2 \rightarrow C_2H_4 + 2H_2O \qquad (1)$$

The catalytic reaction mechanism of the partial oxidative coupling catalyst 10 is as follows. First, oxygen is adsorbed on the active component of the partial oxidative coupling catalyst 10 to become active oxygen species (O*). Methane reacts with the reactive oxygen species O* and abstracts hydrogen atoms therefrom to produce intermediate methyl radicals. The methyl radicals react with each other to produce ethane, which undergoes a dehydrogenation reaction to produce ethylene. The more the active sites capable of forming reactive oxygen species O*, the higher the ethylene selectivity.

However, the reaction between methyl radicals produces not only ethane but also C3 or higher alkanes such as propane and butane. This can produce olefins such as propylene and butene in addition to ethylene. For this reason, unless otherwise specified, the "main reaction represented by reaction formula (1)" in the following description does not include only the reaction in which ethylene is produced, but also the reactions in which olefins other than ethylene are produced. Further, unless otherwise specified, the "ethylene selectivity" in the following description does not mean the selectivity of only ethylene, but the selectivity of olefins containing ethylene.

On the other hand, in the reactor 2, carbon dioxide is also produced by side reactions represented by the following reaction formulas (2) and (3).

$$CH_4 + 2O_2 \rightarrow CO_2 + 2H_2O \qquad (2)$$

$$CH_4 + 3/2O_2 \rightarrow CO + 2H_2O \qquad (3)$$

These side reactions mainly occur in the gas phase and are unrelated to the catalytic action of the partial oxidative coupling catalyst 10, so they may also occur in the region where the main reaction represented by the reaction formula (1) does not occur, i.e., in the spaces S where the partial oxidative coupling catalyst 10 does not exist within the reactor 2, or in gap portions between catalysts packed in the reactor, or while the gas from the reactor 2 flows through the connecting pipe 6.

A preferable range of the flow velocity of the reactant gas flowing through the reactor 2 is 10 to 100 cm/sec. As a result, the residence time of the reactant gas in the space S is shortened, and the time during which only the side reaction represented by the reaction formula (2) occurs is shortened, so that the ethylene selectivity can be increased.

The effluent gas discharged from the reactor 2 contains, in addition to olefins such as ethylene, carbon monoxide, carbon dioxide, and water obtained by the main reaction and side reactions represented by the reaction formulas (1) to (3), methane that has not been consumed in these reactions. While flowing through the connecting pipe 6, the effluent gas is mixed with oxygen supplied to the connecting pipe 6 through the oxygen supply pipe 12 to become a reactant gas and enters the reactor 3. In the reactor 3, similarly to the reactor 2, olefins such as ethylene are produced by the main reaction under the catalytic action of the partial oxidative coupling catalyst 10, and carbon dioxide is produced by the side reactions. When the reactor 3 has the same shape as the reactor 2, the flow velocity of the reactant gas flowing through the reactor 3 becomes equivalent to the preferable range of the flow velocity of the reactant gas flowing through the reactor 2, so that the ethylene selectivity can be increased. The effluent gas discharged from the reactor 3 also contains, in addition to olefins such as ethylene, carbon dioxide, and water, methane that has not been consumed, as well as the effluent gas discharged from the reactor 2. While flowing through the connecting pipe 7, the effluent gas is mixed with oxygen supplied to the connecting pipe 7 through the oxygen supply pipe 13 to become a reactant gas and enters the reactor 4. In the reactor 4, similarly to the reactor 3, olefins such as ethylene are produced by the main reaction under the catalytic action of the partial oxidative coupling catalyst 10, and carbon dioxide is produced by the side reactions. When the reactor 4 has the same shape as the reactors 2, 3, the flow velocity of the reactant gas flowing through the reactor 4 becomes equivalent to the preferable range of the flow velocity of the reactant gas flowing through each reactor 2, 3, so that the ethylene selectivity can be increased.

When the connecting pipes 6, 7 are provided with the coolers 8, 9, respectively, the effluent gases flowing through the connecting pipes 6, 7 are cooled by the coolers 8, 9, and thus the temperatures of the reactant gases flowing into the reactors 3, 4 are lowered compared to the case where the connecting pipes 6, 7 are not provided with the coolers 8, 9, respectively, and the reaction temperatures in the reactors 3, 4 are lowered. In this case, since the side reaction represented by the reaction formula (2) is not related to the catalytic action of the partial oxidative coupling catalyst 10, the reaction rate thereof decreases, and the amount of carbon dioxide produced in each reactor 3, 4 decreases. As a result, it is possible to increase the ethylene selectivity.

As will be described later in detail in Examples, comparing the activity of the partial oxidative coupling catalyst 10 having the active component represented by $M_2ZrO_3$ with the activity of other catalysts, the former is higher under the same reaction temperature conditions. Thus, even if the reaction temperature in each reactor 3, 4 is low, the same amount of olefin can be produced as in the reaction using other catalysts under conditions of higher reaction temperature. As a result, in the olefin production device 1, the side reaction represented by the reaction formula (2) is suppressed while the main reaction represented by the reaction formula (1) is maintained, so the ethylene selectivity can be increased.

Examples

<Preparation of Partial Oxidative Coupling Catalyst>

Lithium zirconate was prepared with the solid phase method according to the following procedure. 1.930 g of lithium carbonate and 3.219 g of zirconium dioxide were placed in an alumina mortar so that the mole ratio of Li and Zr was 2:1, poured with 2 to 3 ml of ethanol, and mixed for about 15 minutes with a pestle. The mixture was heated to 1000° C. at 10° C./min in a muffle furnace and held at 1000° C. for 12 hours. After the mixture thus fired was allowed to cool naturally, it was compressed by using a compression molding machine at a pressure of 15 to 30 MPa, pulverized, and classified into particles of 250 to 500 μm by using a sieve.

Sodium zirconate was prepared with the same method as the preparation method of lithium zirconate by using a mixture of 3.214 g of sodium carbonate and 2.661 g of zirconium dioxide so that the mole ratio of Na and Zr is 2.4:1 (20% excess Na).

Figure 3:
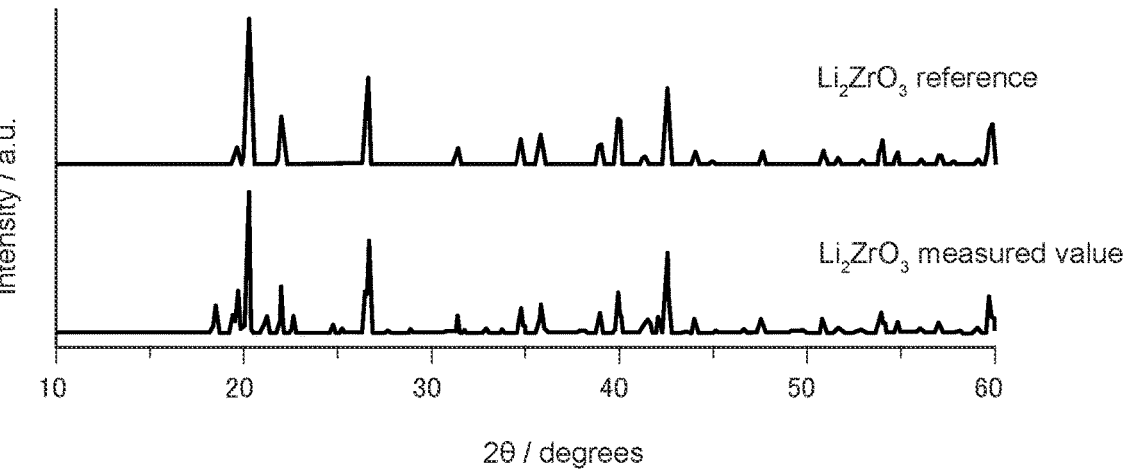
FIG. 3 is a diagram comparing a reference diffraction pattern of lithium zirconate and a measured diffraction pattern of lithium zirconate in an example.

A diffraction pattern of lithium zirconate obtained by the above procedure was determined with a high-resolution X-ray diffractometer (RINT-Ultima 3, Rigaku Corporation). The diffraction pattern was measured by irradiating about 0.1 g of lithium zirconate with CuKα radiation at a scan rate of 7.5 degrees/min. The diffraction pattern thus obtained and a reference diffraction pattern of lithium zirconate are arranged in FIG. 3. As a result, it was confirmed that lithium zirconate was obtained by the above procedure since both diffraction patterns were almost identical.

<Olefin Production Test>

An inert quartz tubular flow reactor (inner diameter: 4 mm, outer diameter: 6 mm, length: 30 cm) was used as the reactor for the olefin production test. As the reactant gas passing through the reactor, a gas diluted with argon was used so that the mole ratio of methane/oxygen was 6.0 and the partial pressure of argon was 89 kPa.

0.2 g of lithium zirconate was placed in the reactor, and the gas was caused to flow through the reactor at a reaction temperature of 800° C., a total pressure of 0.1 MPa, and flow rates of reactant gas varied in the range of 30 to 120 standard $cm^3$/min as Examples 1 to 4. 0.05 g of sodium zirconate was placed in the reactor, and the gas was caused to flow through the reactor at a reaction temperature of 800° C., a total pressure of 0.1 MPa, and flow rates of reactant gas varied in the range of 30 to 120 standard $cm^3$/min as Examples 5 to 8. 0.2 g of sodium zirconate was placed in the reactor, and the gas was caused to flow through the reactor at a reaction temperature of 800° C., a total pressure of 0.1 MPa, and flow rates of reactant gas varied in the range of 30 to 120 standard $cm^3$/min as Examples 9 to 12. 0.2 g of zirconium dioxide was placed in the reactor, and the gas was caused to flow through the reactor at a reaction temperature of 800° C., a total pressure of 0.1 MPa, and flow rates of reactant gas varied in the range of 30 to 120 standard $cm^3$/min as Comparative Examples 1 to 4. Table 1 below summarizes the amount of each catalyst and the flow rate and flow velocity of the reactant gas in Examples 1 to 12 and Comparative Examples 1 to 4.

TABLE 1

| | Catalyst | Content of catalyst (g) | Flow rate of reactant gas (standard cm³/min) | Flow velocity of reactant gas (actual cm/sec) |
|---|---|---|---|---|
| Example 1 | $Li_2ZrO_3$ | 0.2 | 30 | 16 |
| Example 2 | $Li_2ZrO_3$ | 0.2 | 60 | 31 |
| Example 3 | $Li_2ZrO_3$ | 0.2 | 90 | 47 |
| Example 4 | $Li_2ZrO_3$ | 0.2 | 120 | 63 |
| Example 5 | $Na_2ZrO_3$ | 0.05 | 30 | 16 |
| Example 6 | $Na_2ZrO_3$ | 0.05 | 60 | 31 |
| Example 7 | $Na_2ZrO_3$ | 0.05 | 90 | 47 |
| Example 8 | $Na_2ZrO_3$ | 0.05 | 120 | 63 |
| Example 9 | $Na_2ZrO_3$ | 0.2 | 30 | 16 |
| Example 10 | $Na_2ZrO_3$ | 0.2 | 60 | 31 |
| Example 11 | $Na_2ZrO_3$ | 0.2 | 90 | 47 |
| Example 12 | $Na_2ZrO_3$ | 0.2 | 120 | 63 |
| Comparative Example 1 | $ZrO_2$ | 0.2 | 30 | 16 |
| Comparative Example 2 | $ZrO_2$ | 0.2 | 60 | 31 |
| Comparative Example 3 | $ZrO_2$ | 0.2 | 90 | 47 |
| Comparative Example 4 | $ZrO_2$ | 0.2 | 120 | 63 |

In each of Examples 1 to 12 and Comparative Examples 1 to 4, the effluent gas discharged from the reactor was sampled, concentrations of methane, ethane, ethylene, acetylene, propane, propene, butane, butene, carbon monoxide, and carbon dioxide in the effluent gas were determined by gas chromatography, and the methane conversion and the selectivity of ethane, ethylene, acetylene, propane, propene, butane, and butene (hereinafter referred to as "$C_{2-4}$ selectivity") were calculated based on these concentrations. The "methane conversion" is the ratio of the molar reaction amount of methane and the molar supply amount of methane, and the "$C_{2-4}$ selectivity" means the proportion of the molar amount of ethane, ethylene, acetylene, propane, propene, butane, and butene to the molar amount of products other than water obtained by the reaction of methane.

Figure 4:
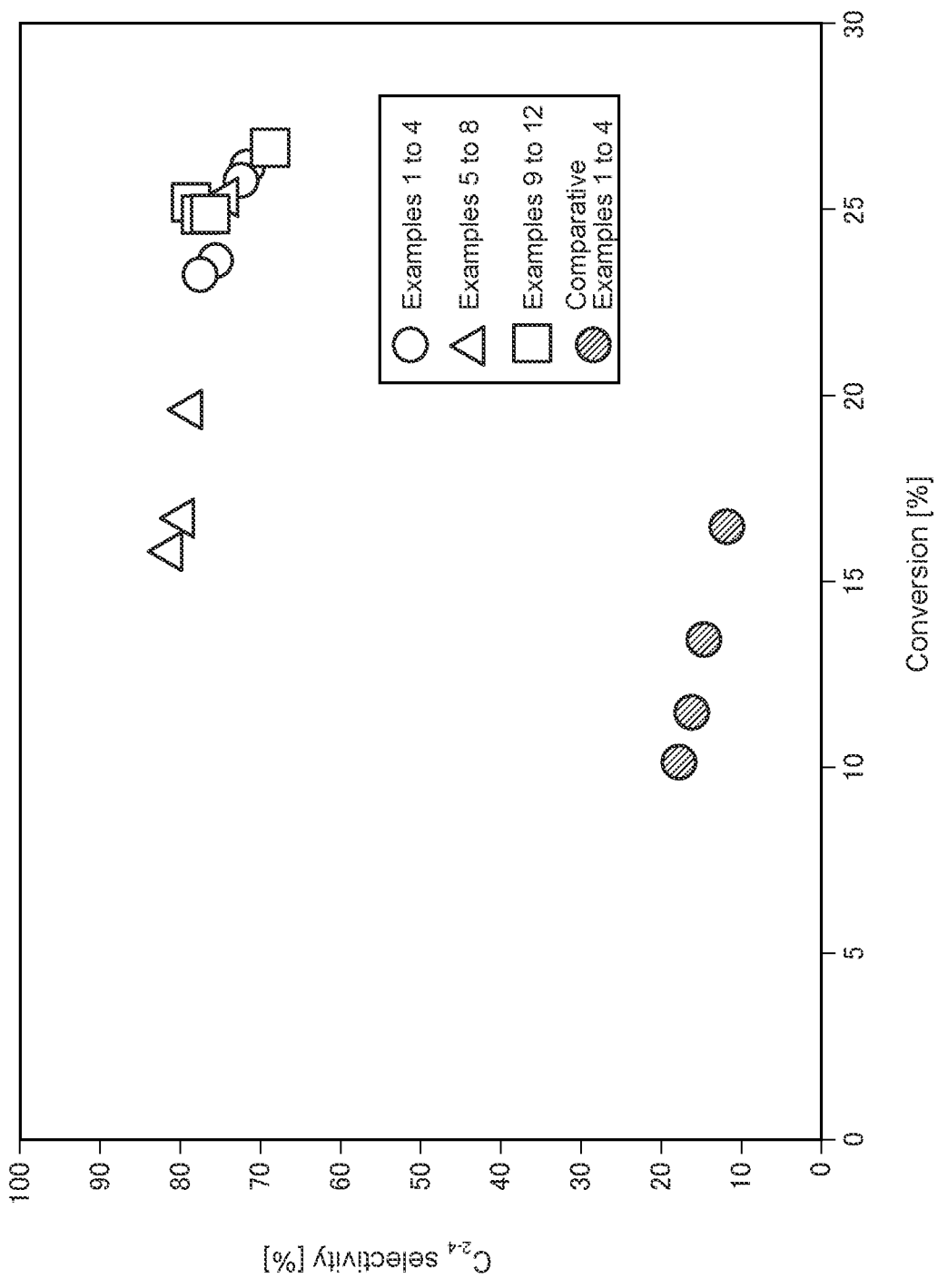
FIG. 4 is a correlation diagram between methane conversion and $C_{2-4}$ selectivity in each example and each comparative example.

FIG. 4 shows a correlation diagram between methane conversion and $C_{2-4}$ selectivity in Examples 1 to 12 and Comparative Examples 1 to 4. It indicates that, at a reaction temperature of 800° C., all Examples 1 to 12 have significantly higher $C_{2-4}$ selectivities than Comparative Examples 1 to 4. Further, when compared with the same catalyst amount, Examples 1 to 4 and 9 to 12 have significantly higher conversions than Comparative Examples 1 to 4. From this, it can be said that the activity of the former was higher than that of the latter. That is, it was found that the $C_{2-4}$ selectivity and activity of Examples 1 to 12 were higher than the $C_{2-4}$ selectivity and activity of Comparative Examples 1 to 4.

Figure 5:
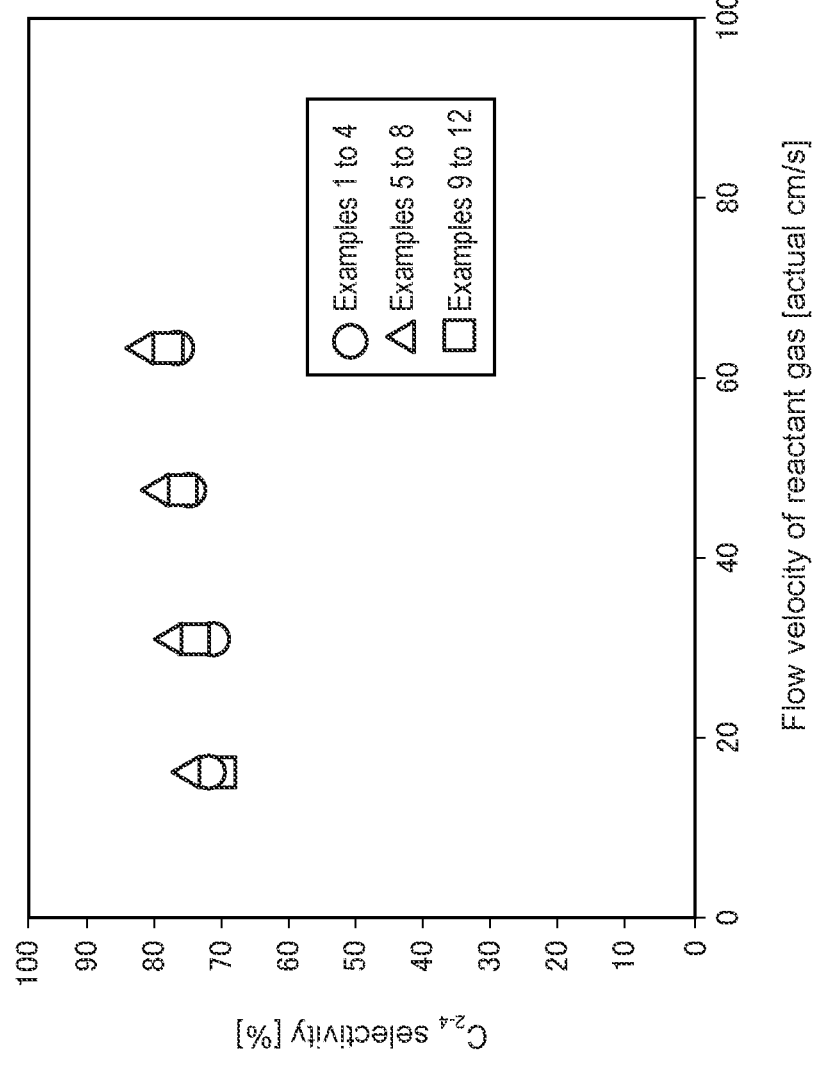
FIG. 5 is a correlation diagram between flow velocity of reactant gas and $C_{2-4}$ selectivity in each example.

FIG. 5 shows a correlation between flow velocity of reactant gas and $C_{2-4}$ selectivity in Examples 1 to 12. For all catalysts, in the range of reactant gas velocity from 16 to 63 cm/sec, the $C_{2-4}$ selectivity increases slightly with increasing reactant gas velocity, but since the increase is also less than 10%, it can be said that the $C_{2-4}$ selectivity is not greatly affected in the range of reactant gas velocity from 16 to 63 cm/sec in Examples 1 to 12. Extrapolating these data of Examples 1 to 12 to the side lower than 16 cm/sec flow velocity and the side higher than 63 cm/sec cm/sec flow velocity, it can be said that the increase in $C_{2\text{-}4}$ selectivity with increasing flow velocity remains about 10% in the range of flow velocity from 10 to 100 cm/sec. Therefore, the flow velocity range of 10 to 100 cm/sec is considered to be a preferable range for the reactant gas flow velocity.

The contents described in the above embodiments would be understood as follows, for instance.

[1] A partial oxidative coupling catalyst according to one aspect has a structure in which a component represented by $M_2ZrO_3$ is supported on a support, where M represents an alkali metal.

With the partial oxidative coupling catalyst according to the present disclosure, it is possible to improve the olefin selectivity in the partial oxidative coupling reaction of methane.

[2] A partial oxidative coupling catalyst according to another aspect is the partial oxidative coupling catalyst of [1], in which the support has at least one of: a nanowire structure with at least one nanometer-order diameter and an aspect ratio exceeding 10:1; or a micro-honeycomb structure having a plurality of elongated holes formed in parallel with micrometer-order aperture size of each hole and micrometer-order wall thickness between adjacent holes.

With this configuration, by supporting the active component on the support with a large specific surface area, the number of catalytically active sites per unit volume of catalyst can be increased, and high activity can be obtained.

[3] An olefin production device according to one aspect is an olefin production device (1) for producing an olefin from a raw material gas containing methane by using the partial oxidative coupling catalyst (10) of [1] or [2], including at least one reactor (2, 3, 4) containing the partial oxidative coupling catalyst (10).

With the olefin production device according to the present disclosure, since an olefin is produced by using the partial oxidative coupling catalyst of [1] or [2], it is possible to improve the olefin selectivity in the partial oxidative coupling reaction of methane.

[4] An olefin production device according to another aspect is the olefin production device of [3] including a plurality of the reactors (2, 3, 4). The reactors (2, 3, 4) are connected in series.

With the olefin production device according to the present disclosure, the flow velocity of the reactant gas flowing through each reactor can be increased compared to the configuration having one reactor or the configuration having a plurality of reactors arranged in parallel. Thus, even if there is a space in the reactor where the partial oxidative coupling catalyst does not exist, the residence time of the reactant gas in such a space is shortened, and the time during which only the side reactions of the OCM reaction occurs is shortened. As a result, it is possible to increase the olefin selectivity.

[5] An olefin production device according to yet another aspect is the olefin production device of [4], further including a cooler (8, 9) disposed between adjacent reactors (2, 3/3, 4).

With this configuration, since the effluent gas discharged from the reactor is cooled by the cooler, the temperature of the reactant gas flowing into the reactor at the later stage is lowered compared to the case where the cooler is not provided, and the reaction temperature in the reactor at the later stage is lowered. In this case, since the side reaction of the OCM reaction formula is not related to the catalytic action of the partial oxidative coupling catalyst, the reaction rate thereof decreases, and the amount of carbon monoxide and carbon dioxide produced in the reactor at the later stage decreases. As a result, it is possible to increase the olefin selectivity.

[6] An olefin production method according to one aspect is an olefin production method for producing an olefin from a raw material gas containing methane by using the partial oxidative coupling catalyst of [1] or [2], including a first reaction step of performing partial oxidative coupling of methane in the raw material gas by using the partial oxidative coupling catalyst.

With this configuration, since an olefin is produced by using the partial oxidative coupling catalyst of [1] or [2], it is possible to improve the olefin selectivity in the partial oxidative coupling reaction of methane.

[7] An olefin production method according to another aspect is the olefin production method of [6], including a second reaction step of performing partial oxidative coupling of methane in an effluent gas of the first reaction step by using the partial oxidative coupling catalyst.

With this configuration, the flow velocity of the reactant gas in each reaction step can be increased compared to a method having only one reaction step. Thus, even if there is a space in the reactor where the partial oxidative coupling catalyst does not exist, the residence time of the reactant gas in such a space is shortened, and the time during which only the side reactions of the OCM reaction occurs is shortened. As a result, it is possible to increase the olefin selectivity.

[8] An olefin production method according to yet another aspect is the olefin production method of [7], further including a step of cooling the effluent gas between the first reaction step and the second reaction step.

With this production method, since the effluent gas of the first reaction step is cooled, the temperature of the reactant gas in the second reaction step is lowered compared to the case where the effluent gas of the first reaction step is not cooled, and the reaction temperature in the second reaction step is lowered. In this case, since the side reaction of the OCM reaction formula is not related to the catalytic action of the partial oxidative coupling catalyst, the reaction rate thereof decreases, and the amount of carbon dioxide produced in the second reaction step decreases. As a result, it is possible to increase the olefin selectivity.

[9] An olefin production method according to yet another aspect is the olefin production method of [7] or [8], in which each of a flow velocity of a reactant gas obtained by mixing the raw material gas and oxygen in the first reaction step and a flow velocity of a reactant gas obtained by mixing the effluent gas and oxygen in the second reaction step is 10 to 100 cm/sec.

With the olefin production method according to the present disclosure, since the flow velocity of the reactant gas flowing through each reactor is high, even if there is a space in the reactor where the partial oxidative coupling catalyst does not exist, the residence time of the reactant gas in such a space is shortened, and the time during which only the side reactions of the OCM reaction occurs is shortened. As a result, it is possible to increase the olefin selectivity.

REFERENCE SIGNS LIST

1 Olefin production device
2 Reactor
3 Reactor
4 Reactor
8 Cooler
9 Cooler
10 Partial oxidative coupling catalyst

The invention claimed is:

1. An olefin production device for producing an olefin from a raw material gas containing methane, comprising:

at least one reactor containing a partial oxidative coupling catalyst, and a plurality of the reactors connected in series, wherein the partial oxidative coupling catalyst comprises a support and a component represented by $M_2ZrO_3$ supported on the support, where M represents an alkali metal.

2. The olefin production device according to claim 1, further comprising a cooler disposed between adjacent reactors.

3. An olefin production method for producing an olefin from a raw material gas containing methane, comprising:

a first reaction step of performing partial oxidative coupling of methane in the raw material gas by using a partial oxidative coupling catalyst, wherein the partial oxidative coupling catalyst comprises a support and a component represented by $M_2ZrO_3$ supported on the support, where M represents an alkali metal.

4. The olefin production method according to claim 3, comprising a second reaction step of performing partial oxidative coupling of methane in an effluent gas of the first reaction step by using the partial oxidative coupling catalyst.

5. The olefin production method according to claim 4, further comprising a step of cooling the effluent gas between the first reaction step and the second reaction step.

6. The olefin production method according to claim 4, wherein each of a flow velocity of a reactant gas obtained by mixing the raw material gas and oxygen in the first reaction step and a flow velocity of a reactant gas obtained by mixing the effluent gas and oxygen in the second reaction step is 10 to 100 cm/sec.

* * * * *